(12) United States Patent
Kovácsay et al.

(10) Patent No.: US 11,192,988 B2
(45) Date of Patent: Dec. 7, 2021

(54) PHENOL-FURAN RESIN COMPOSITION

(71) Applicant: Kompozitor Kft., Vecsés (HU)

(72) Inventors: István Kovácsay, Budapest (HU);
Lídia Kecskeméthy, Budapest (HU);
Norbert Piukovics, Budapest (HU)

(*) Notice: Subject to any disclaimer, the term of this patent is extended or adjusted under 35 U.S.C. 154(b) by 32 days.

(21) Appl. No.: 16/548,163

(22) Filed: Aug. 22, 2019

(65) Prior Publication Data
US 2020/0255612 A1 Aug. 13, 2020

Related U.S. Application Data

(63) Continuation of application No. PCT/HU2019/005004, filed on Feb. 13, 2019.

(30) Foreign Application Priority Data

Feb. 13, 2019 (WO) .................. PCT/HU2019/05004

(51) Int. Cl.
| | |
|---|---|
| C08J 5/24 | (2006.01) |
| C08L 61/06 | (2006.01) |
| C09K 21/02 | (2006.01) |
| F23J 13/02 | (2006.01) |
| E04F 17/02 | (2006.01) |

(52) U.S. Cl.
CPC .................. *C08J 5/24* (2013.01); *C08L 61/06* (2013.01); *C09K 21/02* (2013.01); *F23J 13/02* (2013.01); *C08J 2361/06* (2013.01); *C08J 2361/24* (2013.01); *C08J 2471/14* (2013.01); *C08L 2201/02* (2013.01); *C08L 2205/025* (2013.01); *E04F 17/02* (2013.01)

(58) Field of Classification Search
CPC ...... C08L 61/06; C08L 61/30; C08L 2201/02; C08L 2205/025; F23J 13/02; C08J 5/24; C08J 2471/14; C08J 2361/24; C08J 2461/24; C08J 2361/06; C09K 21/02; C09K 3/36; C09K 3/40; C08K 3/40; C08K 3/36; E04F 17/02
USPC ........................................................ 524/100
See application file for complete search history.

(56) References Cited

U.S. PATENT DOCUMENTS

| | | | |
|---|---|---|---|
| 2006/0186404 A1* | 8/2006 | Uchida | H01L 21/67259 257/48 |
| 2016/0060281 A1* | 3/2016 | Angell | C09K 21/12 524/119 |
| 2017/0127525 A1* | 5/2017 | Schonholz | H05K 1/186 |

FOREIGN PATENT DOCUMENTS

| | | |
|---|---|---|
| GB | 2473226 | 3/2011 |
| HU | 218726 | 11/2000 |
| JP | H093302 A | 1/1997 |
| JP | 2000239491 | 9/2000 |

* cited by examiner

*Primary Examiner* — William K Cheung
(74) *Attorney, Agent, or Firm* — Jason Bergeron

(57) ABSTRACT

The present invention fills a long-felt need for an improved phenol-furan resin composition used as a chimney liner with reduced combustibility, and for the preparation of pre-impregnated fiber-reinforced composite material and its use. The invention shows a higher tolerance for certain conditions that are damaging to other resin compositions including higher heat tolerance and higher tolerance for flue gases and other compounds.

8 Claims, No Drawings

PHENOL-FURAN RESIN COMPOSITION

SUMMARY OF THE INVENTION

The present invention relates to an improved phenol-furan resin composition with reduced combustibility and to the production of a composite material to be pre-impregnated and fibre-reinforced with the improved phenol-furan resin composition. Further, the subject of the invention is also the application of the pre-impregnated and fibre-reinforced composite material.

Pre-impregnated materials of mainly cross-linking resin e.g. epoxy, unsaturated polyester, phenol and furan resins have long been applied to produce composite products of high technical capacity as reinforced with high-strength fibres. Some heat-resistant, reduced-combustion thermosetting resin-impregnated fiber-reinforced composite materials, such as furan resin-based composite materials, serve as high-strength, heat-resistant products such as chimney liners. Their advantages, besides heat-resistance, include high resistance to corrosive chemicals, such as sulphuric condensation in flue gases. The strength of such composite materials, depending on their reinforcing fibres, can exceed even that of steel, at one-quarter the weight. However, composite materials' heat-resistance is significantly lower than that of steel. The subject invention comprises a resin with heat-resistance comparable to that of steel, as well as a pre-impregnate to be produced from said resin. The present invention also discloses pre-impregnated composite materials with decreased combustibility compared to that known in the art, whereas decreased combustibility, heat-curing and cross-linking resins are used for the impregnation of paper or natural fibres, e.g. cellulose, wool etc., or synthetic fibres of fabrics, e.g. glass, carbon, graphite, polyamide or Kevlar, and then, laminates are produced from them by pressing. The laminates impregnated with resin are partially cross-linked prior to creating the end product; the partially cross-linked laminates are said to be in a "B" state, wherein the laminates are still malleable impregnates. This state allows storage of the impregnated material, even for months given proper storage temperature. These impregnated materials of "B" state, called "prepregs", can be hardened by heat and pressure, shaping them irreversibly to any desired shape. The pre-impregnated composite laminates are applied as chimney liners, among other applications. Other decreased-combustibility resin systems are also known, although the heat-resistance of known prior art is far behind that desired or their mechanic characteristics are inappropriate for certain applications.

The currently known composite-prepreg production technologies can be summarised as follows: The process of impregnation is carried out in a solved or solvent-free original form of the resin used for the impregnation. The impregnation is applied with unfilled resins or filled with fillers. Practically applied, heat-cured plastic raw materials used for producing pre-impregnates include the following:
  epoxy resins
  unsaturated polyester resins
  phenolic resins
  furan resins
  melamine resins and
  carbamide resins.

The certain resin types can be made cross-linked with the use of various cross-link generators, initiators and catalysts available. The range of resin constitution may be further widened with the application of various filling agents. The purpose of that is to improve or change the mechanical, chemical and physical characteristics of the product and, in a fewer number of cases, to make the product cheaper.

More generally known filling materials include the following:
  calcium-carbonate (lime stone)
  kaolin
  wollastonite (Ca-silicate)
  silica four
  slate powder
  glass pearl compact and cored
  talc
  perlite
  aluminium-oxide
  colloid-silica The "B" that is flexible state pre-impregnate is hardened in a press by applying overpressure at 60-200° C. temperature, whereas the cross-linkage gets completed. The material in its "B" state is first softened by the effect of the heat, becomes malleable, and then, along the progress of the cross-linking reactions, the material hardens. From the manufacturing aspect, it is essential that the "B" state lasts for a longer period, in certain cases even throughout weeks long to make sure the pre-impregnate can be stored long enough accordingly.

In order to reach the appropriate life-cycle of the "B" state, different processes are applied at the different types of resins. With epoxy-resins, cross-linkage of two or more functions is applied. In case of Polyester-resin, a so-called "quasi-B" state can only be reached by mixing additives of alkali-earth metal-oxides and hydroxides (e.g. MgO) with the Polyester-resin. With phenol-resins, the "B" state sets in by the effect of either a catalyst or heat-treatment. With furan or carbamide-resin, the state can only be reached together with phenol-resin.

The hardness characteristics of products made from prepregs depend on the type, amount and direction of the reinforcing fibres in the resin. Common reinforcing fibres include the following:
  glass-fibre (9-16 µm diameter of continuous roving-fibre bunch)
  cut glass-roving fibre of various diameters
  glass mat
  glass-cloth
  in certain cases, supplementary ground glass-fibre (fibre length<1 mm)
  carbon filament in cut, ground or textile form
  aromatic polyamide (Kevlar®) textile.

Besides the hardness features, another important requirement may be the decreased combustibility. To make sure that is also provided, the following common additives may be applied:
  aluminium-hydroxide
  antimonial compounds
  boron compounds
  halogenic compounds
  phosphorus derivatives,
  nitrogen compounds such as melamine derivatives, ureas, cyanurates,
  as well as their combinations e.g. antimony-trioxide+hexabromide cyclododecane, in the case of which a clear synergic effect can be observed.

Prepregs known in the art, as described above, have a number of useful characteristics. However, few of these materials combine good corrosion resistance and low combustibility with high mechanical hardness, and none of those have high resistance to heat in excess of 900° C.

The furan-phenol-carbamide based systems have excellent fire-resistance capacities even without fire-retardant additives, can reach B1 ("schwerentflamm-bar") classification as per the MSZ EN ISO 1182 standard, which corresponds to the "hardly combustible" class under the MSZ 14800/3 standard.

In the field of heat, flame and fire-resistant composites, e.g. regarding chimney liner tubes, an increasing demand is shown for such materials, which however do not necessarily reach "A2"=non-combustible effect under the above standard but show significantly better results than required under "B1". One of these requirements is 30 minute resistance to an environment of 1000° C. heat, as stipulated in the EN 1443 inspection standard, which means retaining the majority of the formal and mechanical characteristics of the product subject to the inspection. This means the chimney liner in the present example cannot collapse by the effect of the exposure concerned.

This, for example, refers to chimneys of such composite materials, which are connected to wood-burning stoves. In these heating systems, carbon black, tar-like condensation of several components accumulates on the inner surfaces of the chimney, which in certain cases can ignite. Following any possible fire, the composite chimney must remain airtight so that no flue gas may intrude in the living space.

Besides the above-mentioned requirements, easy processability with the commonly applied methods and the relatively cheap price also offer novel advantages.

DESCRIPTION OF THE PRIOR ART AND THE OBJECT OF THE PRESENT INVENTION

Flame-resistant resin-preparation and laminate are described in the patent description of "JP2000239491 (A) (FLAME-RETARDANT RESIN COMPOSITION, AND PREPREG AND LAMINATE MADE BY USING IT)", which does not disclose any added halogenic compounds. The preparation is essentially contains-non-halogenated epoxy resin (Component A) a cross-linkage agent containing phenol novolac resin enriched with triazine (Component B) and a compound with the formula of 9,10-dihidro-9-oxa-10-(2,5-dioxotetrahidro-3-furanil-metil)-10-foszfafenant-ren-10-oxid (Component C). The prepreg is produced by the impregnation of the carrier with the resin-preparation.

A phenolic resin containing phosphor, presented in the patent description of JP9003302 (A) (PHENOLIC RESIN COMPOSITION, PREPREG PRODUCED USING SAME AND LAMINATE), displays the properties appropriate heat- and flame-resistance, and further, upon adding appropriate additives, is suitable for producing prepregs. The preparation contains a phosphor compound as well as at least one nitrogenous compound of cyanogen-diamide and aniline containing any melamine resins, carbamide resins, urethane resins and their modified versions, one cyanurate compound and hydroquinone. If the preparation is used for producing laminate of approximately 50 percent by weight solid material content, its ideal phosphor compound content is 0.5-3 percent by weight, and its ideal cyanurate content is 1-10 percent by weight.

Patent specification No. GB2473226 (A) (Composite materials) presents a cross-linking prepreg appropriate for producing structural elements of airplanes. This prepreg contains a layer of conductive fibres and the first outside layer of a heat-convertible resin. The resin layer contains heat-convertible particles and carbon grains for providing better electric conductivity, by which the resistance to damage caused by lightning is improved. Beyond that, it has excellent mechanical characteristics as well.

Patent specification No. HU218726 presents a hardened and glass-fibre reinforced resin-based chimney liner with resistance to the temperature (maximum 250-350° C.) of flue gases common to chimneys as well as the corrosive effects of said flue gases. The resin is either pure furan resin or a 95/5 percent by weight mixture of phenolic resin and furan resin. The resin preferably contains fire-retardant filling material. However, the chimney liner created by this method can bear the temperature up to 250-350° C., and therefore can resist the relatively low temperature flue gases emitted by modern gas-burning stoves, as well as withstand said gases' corrosive effects. However, in case of common wood or coal stoves and fireplaces, where flue gases may have temperatures in excess of 900° C., the applied method of glass-fibre reinforced and hardened furan-based resin chimney liners are no longer appropriate. The chimney liner exposed to the given temperature rapidly spoils, and in certain cases can even pose a fire hazard. None of the materials presented in the above literature withstand these conditions.

Hungarian patent application No. P1300573 describes a furan resin-based composite material with good heat resistance and decreased combustibility. However, the heat resistance of this material fails to reach the desired level.

In addition to the shortcomings presented in the above references, the use of compounds containing boron is undesirable due to the risk of boron exposure; in recognition of this risk, the use of boron compounds is limited by European regulations.

Due to the above reasons, the development of a new composite material would fill a long-felt need for a material which can withstand the conditions inside a flue. It is an object of the present invention to provide a composite with improved heat resistance which will retain its shape and material properties under conditions of long-term exposure to heat in excess of 900° C. and corrosive flue gases. It is a further object of the present invention that the composite has a boron content below the one percent by weight maximum allowed by the European Union for relevant applications. It is a further object of this invention that it has reduced flammability relative to existing composites in this application.

DETAILED DESCRIPTION OF THE INVENTION

It has been discovered that, in addition to using additives and fillers, well-known components applied in other composite materials e.g. glass-fibre, glass pearl, boron compounds, the use of natrium-metasilicates (especially pentahydrate readily available in commerce) and melamine-derivatives (more exactly compounds containing homologues and preferably mainly melem and less melam (available in trade as Delflam®, producer: Delamin Ltd United Kingdom)) as flame retardants and their relative proportions in the present invention, the fire-retardant effect is significantly increased, among others, due to the synergic effect of Delflam® and the boron compounds present in a concentration below one percent by weight (calculated to elemental boron) as well as due to the special characteristics of Na-metasilicates.

Na-metasilicate ($Na_2SiO_3$) is the salt of orthosilicic acid and natrium. Its water solution is one of the components of soluble glass. Soluble glass is in fact various solutions of natrium-silicate. If dissolved in water, it composes a solution of alkaline reaction. In commerce, it is mostly available with its pentahydrate crystal version, but its anhydrate and nonahydrate forms are also known. It is also used as an additive in cement for producing heat-, water-, and acid-resistant cements, and in the paper industry as well. Due to its alkaline reaction and good emulsifying characteristic, it is widely used in solid cleaning compositions. No information is available regarding the admixture of plastic composites with metasilicates.

The melting point of Na-metasilicate pentahydrate is 72° C., while the anhydrate has a melting point of 1088° C. (Donauchem Kft, HU—data sheet).

Without linking it with any specific theoretical considerations, by the effect of high temperature that can be generated in a fire, the melted pentahydrate covers the organic particles and, while foaming, gradually losing water endothermically and transforming to a state with higher and higher melting point, it protects the composite material from destruction.

We have recognised the unexpected effect that despite of the Na-metasilicates with alkaline reaction in water solutions applied even in large amounts, no detectible change in the cross-linkage of phenolic resin sets in. Therefore, it can be applied in the production of composite materials with phenolic resin content and reduce the amounts of boron compounds at the same time. As a result the decreased amount of boron compound applied, the known phenomenon of complexing does not happen, or it happens only to such an insignificant extent that does not significantly influence the creation of the "B" state of the phenolic resin.

The fire-retardant feature of melamine derivatives, especially the mixture of melem and melam (Delflam®), further results in the effect that at high temperature, large amount of nitrogen are discharged, which has a fire-retardant effect without producing large amounts of smoke. At the same time, melamine derivatives produce a further synergistic effect with combustion-retardant agents of organic phosphate. Therefore, the desirable effect can be obtained with a smaller quantity of such agents.

The Structure of Delflam®

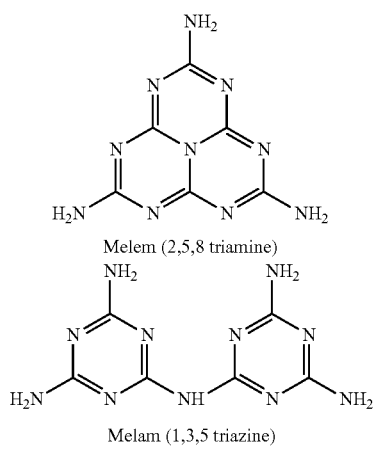

The composite material according to the invention, in conjunction with the composite material presented in the patent description of Hungarian file number P1300573 provides better resistance to both alkalis and acids, and at the same time can withstand much higher temperatures without being spoiled.

The composite material subject to the invention is described in more details in the following:

The liquid resin composition according to the present invention suitable for the production of pre-impregnated, fibre-reinforced composite material with improved fire and heat resistance, comprising a mixture of furan-, phenol-, carbamide-resin and acid catalyst contains 3 to 13 percent by weight Na-metasilicate (preferably in pentahydrate form), 1 to 7 percent by weight melamine derivative, 0.5 to 2 percent by weight ammonium polyphosphate and up to 1 percent by weight boron compound per elemental boron as well as commonly used other filling materials.

The liquid resin mixture contains phenolic resin of 60 to 80 percent by weight and furan resin of 10 to 16.7 percent by weight or carbamide resin of 10 to 16.7 percent by weight and as catalyst, organic acid and/or anhydride of 1 to 10 percent by weight slowly solving in the resin mixture. Such catalysts may be among others methylhexahydrophthalic anhydride, phthalic anhydride, maleic anhydride, oxalic acid, sulfanilic acid and mixtures thereof.

The liquid resin composition according to the present invention containing mixture of liquid resins and catalysts comprises 3 to 13 percent by weight Na-metasilicates, 1 to 6 percent by weight melamine derivatives, 4 to 10 percent by weight (calculated to elemental boron<1 percent by weight) borax and/or boric acid and/or Zn-borate, 0 to 8 percent by weight ammonium-polyphosphate, 0 to 13 percent by weight silica and 0 to 1 percent by weight colloid $SiO_2$ (silica fume).

The liquid resin composition according to the present invention comprises, as corrosion-resistance and chemical resistance improving filling material 0 to 11 percent by weight glass flakes of maximum 1,700 micrometres diameter and 6.5 to 8.5 micrometres thickness.

The liquid resin composition according to the present invention additionally comprises other commonly used filling materials and colouring agents of 0 to 7 percent by weight.

In the reduced flammability phenol-furan resin composition according to the present invention and the prepreg or reinforced composite material made therefrom the main flame retardant components are the Na-metasilicate, preferably its penta-hydrate, melamine derivative, preferably a mixture of mostly melem, and less amount of melam, and a boron compound in an amount below the maximum allowed limit value (calculated to elemental boron<1 percent by weight).

A significant difference between the prepreg compositions of the previous patent application number P1300573 and that of the present invention is that the amount of boron compounds in the mentioned description (boric acid and borax) exceeds 26 percent by weight, while in the composition according to the present invention it does not reach 1 percent by weight (calculated to elemental boron).

The proportion of phenolic resin has been increased, which improves the creation of the "B" state, and the decreased boron content has been dropped as a result of its complexing of effect disturbing the creation of the stable "B" state. The inspection materials prepared with the prepregs created by the matrix material set up during the samples were, in each case inspected after the cross-linkage set in. The cross-linkage was carried out in the common method at 105° C. temperature over 120 minutes.

Sample 1

Matrix material is prepared for the production of prepreg: 500 weight parts of phenolic resin with 100 weight parts of furan resin. To the resin mixture, this method adds 180 weight parts of Na-metasilicate pentahydrate (Donauchem Kft), 30 weight parts of Delflam® (Delamim Ltd., UK), 120 weight parts of glass flake (GF750) Glassflakes (Glassflakes Ltd., UK), or (Owens-Corning, US) 420 weight parts of glass pearl of 50 micrometres, 2 mass rate of yellow iron oxide, 60 weight parts of borax and, as catalyst, 60 mass rate of sulfanilic acid. With matrix material prepared in the above method, glass textile of 330 g/m2 is impregnated so that the resin-glass textile weight parts is 70:30. A test sheet is made of the prepreg in the method of pressing according to MSZ EN ISO 1182 standard.

Sample 2

The process follows the entire method described in Sample 1, except that only 50 weight parts of Na-metasilicate pentahydrate are used instead of 180.

Sample 3

The process follows the entire method described in Sample 1, except that in place of 100 weight parts furan resin, an equal amount of carbamide resin is used.

Sample 4

The process follows the entire method described in Sample 1, except that the boron compound is omitted.

Sample 5

The process follows the entire method described in Sample 3, except that instead of 3.4 weight parts of borax, 3.4 weight parts of boric acid is mixed in the matrix materials.

Sample 6

Matrix material is prepared for the production of Prepreg: 28 weight parts of phenolic resin is mixed with 6 weight parts of furan resin. To the resin mixture, this method adds 11 weight parts of Na-metasilicate pentahydrate (Donauchem Kft), 1.7 weight parts of Delflam® (Delamim Ltd., UK), 8.5 weight parts of Glassflakes (Glassflakes Ltd., UK), 23.8 weight parts of maximum 50 micrometres diameter of glass pearl, 0.12 weight parts of yellow iron oxide, 3.4 weight parts of borax and, as catalyst, 3.4 weight parts of sulfanilic acid. With matrix material prepared in the above method, glass textile of 330 g/m2 is impregnated so that weight parts of the resin-glass textile is 70:30. A test sheet is made of the prepreg in the method of pressing according to MSZ EN ISO 1182 standard.

Sample 7

To the mixture of 90 weight parts of phenolic resin and 15 weight parts of furan resin, this method adds 30 weight parts of Na-metasilicate pentahydrate, 5 weight parts of Delflam®, 25 weight parts of glass flakes, 70 weight parts of glass pearl, 0.4 weight parts of colouring (yellow iron oxide), 10 weight parts of borax ($Na_2B_4O_7 \cdot 10H_2O$) and 10 weight parts of sulfanilic acid as catalyst. With this mixture, 50 weight parts of glass textile is impregnated. The boron content calculated to the complete mass of the prepreg is below 1% by mass. The prepreg prepared in this method meets the requirements of the combustion inspections (at 550 C.° and then at 1000 C.°) under EN 1443.

Sample 8

To the mixture of 90 weight parts of phenolic resin and 15 weight parts of furan resin, this method adds 30 weight parts of Na-metasilicate pentahydrate, 5 weight parts of Delflam®, 25 weight parts of glass flakes, 70 weight parts of glass pearl, 0.4 weight parts of colouring (yellow iron oxide), 10 weight parts of sulfanilic acid as catalyst. With this matrix mixture, 50 weight parts of glass textile is impregnated. The prepreg prepared in this method fails to meet the requirements of the combustion inspections (at 550 C.° and then at 1000 C.°) under EN 1443.

Sample 9

The process follows the entire method described in Sample 6, except that 10 weight parts of boric acid are also added to the matrix. The boron content calculated to the complete mass of the prepreg is below 1% by mass. The prepreg prepared in this method meets the requirements of the combustion inspections (at 550 C.° and then at 1000 C.°) under EN 1443.

Sample 10

The process follows the entire method described in Sample 6, except that instead of 23.6 weight parts of glass pearl, the method adds 20 weight parts of $Al_2O_3$; further, instead of 3.4 weight parts of borax, this method adds 2 weight parts of Zn-borate. The prepreg prepared in this method meets the requirements of the combustion inspections (at 550 C.° and then at 1000 C.°) under EN 1443.

Sample 11

The process follows the entire method described in Sample 6 with the only difference that instead of 23.8 weight parts of glass pearl, 30 weight parts of silica flour and 10 weight parts of ammonium-polyphosphate and instead of 3.4 weight parts of borax, 2 weight parts of Zn-borate is mixed in. The prepreg prepared in this method meets the requirements of the combustion inspections (at 550 C.° and then at 1000 C.°) under EN 1443.

Sample 12

To the mixture of 90 weight parts of phenolic resin and 15 weight parts of furan resin, this method adds 30 weight parts of Na-metasilicate pentahydrate, 5 weight parts of Delflam®, 20 weight parts of silica flour, 60 weight parts of glass pearl, 0.4 weight parts of colouring (yellow iron oxide), 10 weight parts of sulfanilic acid as catalyst. With this matrix mixture, 50 weight parts of glass textile is impregnated. The prepreg prepared in this method fails to meet the requirements of the combustion inspections (at 550 C.° and then at 1000 C.°) under EN 1443.

Carrying out the inspection on the specimen according to the prescription of standard number MSZ EN ISO 1182, the following results were presented:

| Sample | fire-resistance class | EN 1443 inspection |
|---|---|---|
| Sample 1 | A2 (non-combustible) | no data |
| Sample 2 | B1 | no data |
| Sample 3 | A2 | no data |
| Sample 4 | B1 | no data |
| Sample 5 | A2 | no data |
| Sample 6 | A2 | no data |
| Sample 7 | A2 | no data |
| Sample 8 | A2 | no data |
| Sample 9 | A2 | complies |
| Sample 10 | A2 | complies |
| Sample 11 | A2 | complies |
| Sample 12 | B1 | fails to comply |
| Sample 13 | A2 | complies |
| Sample 14 | A2 | complies |

The embodiments of the invention described herein are illustrative and do not represent the entirety of the matter which falls under the claims. Further applications and embodiments will be apparent to one skilled in the art upon reading the disclosure herein.

The invention claimed is:

1. A liquid resin composition suitable for the production of pre-impregnated, fibre-reinforced composite material used as a chimney liner with improved fire and heat resistance, comprising:

a resin mixture comprising:
- 60 to 80 percent by weight phenolic resin,
- 10 to 16.7 percent by weight furan resin or
- 10 to 16.7 percent by weight carbamide resin, and
- 7 to 10 percent by weight acid catalyst, characterised in that said liquid resin composition furthermore comprises:
- 3 to 13 percent by weight Na-metasilicate,
- 1 to 6 percent by weight a mix of melem and melam,
- 0 to 8 percent by weight ammonium-polyphosphate, and
- a maximum of 1 percent by weight boric compound calculated to elemental boron as fire-retardant additives.

2. The liquid resin composition of claim 1, further comprising filling materials and colouring materials.

3. The liquid resin composition of claim 2, wherein the filling materials comprise metal oxides, kaolin, or glass pearl.

4. The liquid resin composition of claim 1, wherein the Na-metasilicate comprises Na-metasilicate pentahydrate in dry powder form.

5. The liquid resin composition of claim 1, wherein the boric compound is boric acid, borax and/or Zn-borate.

6. The liquid resin composition of claim 1, characterized in that the resin preparation contains a 8 to 11 percent by weight glass flakes, said glass flakes being 6.5-8.5 micrometres thick and a maximum of 1700 micrometres in diameter.

7. A method of using the liquid resin composition of claim 1 for preparing a pre-impregnated, fibre-reinforced composite material as a prepreg by impregnating a glass fabric with the liquid resin composition, wherein the resin mixture: glass fibre weight ratio is (60-80):(40-20).

8. The method of using the prepreg of claim 6 for the preparation of a composite material used as a chimney liner in the common method at 105° C. temperature over 120 minutes, wherein, said method comprising crosslinking by cross-link generators, initiators, or catalysts.

* * * * *